United States Patent
Kagan

[11] Patent Number: 6,032,877
[45] Date of Patent: Mar. 7, 2000

[54] HUMIDIFYING DEVICE

[75] Inventor: Andrew Kagan, Chesterfield, Mo.

[73] Assignee: Master Home Products, Ltd., Skokie, Ill.

[21] Appl. No.: 08/905,473

[22] Filed: Aug. 4, 1997

[51] Int. Cl.⁷ ...................................................... F16K 1/02
[52] U.S. Cl. .............................................................. 239/446
[58] Field of Search ................................... 234/444, 446, 234/447, 124; 137/862

[56] References Cited

U.S. PATENT DOCUMENTS

| | | | |
|---|---|---|---|
| 2,484,942 | 10/1949 | Guise | 239/446 X |
| 3,106,937 | 10/1963 | Sands | 239/446 X |
| 3,112,073 | 11/1963 | Larson et al. | 239/446 |
| 3,133,701 | 5/1964 | McClenahan . | |
| 3,143,299 | 8/1964 | Benjamin . | |
| 3,791,588 | 2/1974 | Buzzi | 239/446 |
| 4,084,271 | 4/1978 | Ginsberg | 239/446 X |
| 5,788,160 | 8/1998 | Woog | 339/446 X |

Primary Examiner—Kevin Weldon
Attorney, Agent, or Firm—Hill & Simpson

[57] ABSTRACT

The invention is directed to a humidifying device which can be coupled to a conventional water feed pipe and shower head. The device includes a main body having a flow path, a diverter valve provided within the main body, the valve having at least two flow passageways therethrough, and a spray nozzle capable of being in fluid communication with one of the flow passageways of the diverter valve. The diverter valve can be placed in one of two positions, the position of the valve determining the flow path of water from the feed pipe. In the first position, water flows from the feed pipe, through the main body, and out the shower head. In the second position, the water flows from the feed pipe, through the main body and out the spray nozzle. The spray nozzle is capable of atomizing fluid flowing therefrom, thereby humidifying the air in a space.

3 Claims, 4 Drawing Sheets

HUMIDIFYING DEVICE

BACKGROUND OF THE INVENTION

This invention relates generally to humidifying devices and more particularly to a humidifying device for humidifying a home, apartment, hotel room, office or other habitation space.

For many people suffering with respiratory conditions, the air in their work and living environments does not contain a sufficient amount of humidity, especially during the heating season months when indoor humidity can reach as low as 10%, making occupying the space uncomfortable and unhealthy while also increasing static electricity. To ease and/or prevent further aggravation of their conditions, these people often employ various humidifying devices to add the necessary amount of humidity to the air. One of these devices involves injecting water vapor into the air flow of a central heating/air conditioning system, thereby humidifying the air flow. Another attempt at addressing the problem is the use of portable humidifying units. One type is an evaporative humidifier which includes a water reservoir and some means for moving an absorbent material, which has been wetted in the reservoir, past a fan or other air stream generator. Other portable types include ultrasonic humidifiers which create a cool mist by means of ultrasonic sound vibrations, impeller humidifiers which produce a cool mist by means of a high speed rotating disk, and steam vaporizer humidifiers which create steam by heating water with an electrical heating element or electrodes.

The attempts of the past, however, have involved numerous drawbacks. For example, the use of central type, ducted humidifying systems brings about the potential hazard for cultivation of disease-causing microorganisms either within the water reservoir or within the areas of pooled water or condensation accumulating within the ductwork. Further, the centrally installed devices are expensive to purchase, relatively difficult to install, non-transportable, and, in many cases, difficult to maintain properly.

The portable devices also have their share of shortcomings. For example, the use of the portable units involves the danger of breeding potentially deadly and often foul-smelling microorganisms within the water reservoir and therefore requires the continual replacement of expensive and cumbersome filter elements in order to limit the growth of such organisms. Similarly, these units often necessitate the use of toxic and environmentally hazardous chemicals in order to suppress the growth of such microorganisms. Users are instructed by manufacturers of these units and by the Environmental Protection Agency to thoroughly clean their units every day to avoid problems. Unfortunately, the users often times ignore these instructions and thus the possible presence of such microorganisms, thereby endangering their health. Electric units also involve the risk of electrocution resulting from the electrical connection to the fan motors, particularly since the wiring must exist in close proximity to the water reservoir. The risk of fire is also a consideration whenever motors and wiring are involved. Additionally, there is, of course, the awkward necessity of continually refilling the water reservoirs, often resulting in spillage and concomitant potential for damage to flooring, carpeting, plasterwork of ceilings, etc. Also, the constant refilling is difficult for individuals with back problems.

The use of these devices can further result in water-borne mineral dust being dispersed throughout the habitation space. This dust aggressively covers surfaces and renders cleaning very difficult.

Thus, it is an object of the instant invention to provide a humidifying device that presents no potential for the cultivation of dangerous microorganisms and foul odors and thus requires no filters or dangerous biohazardous bacteriostatic chemicals.

It is another object of the instant invention to provide a humidifying device which poses no hazard of electrocution or electrical fires.

It is yet another object of the instant invention to provide a humidifying device which does not require filling.

It is a further object of the instant invention to provide a humidifying device that minimizes the dispersion of mineral dust through the habitation space.

It is yet a further object of the instant invention to provide a humidifying device which is inexpensive to design and manufacture.

It is yet another object of the instant invention to provide a humidifying device which is inexpensive to install and requires little, if any, maintenance.

It is a still further object of the instant invention to provide a humidifying device which is economical to operate.

It is still another object of the instant invention to provide a humidifying device which is small, inexpensive, and has portability.

These and other objects and advantages of the instant invention will be apparent from the following description and drawings.

SUMMARY OF THE INVENTION

The present invention overcomes the deficiencies of the prior art devices by providing a humidifying device comprising a two-way diverter valve means, a pressure atomizing spray nozzle means, and a first coupling means for coupling the valve means and the nozzle means to a water feed pipe. The device further includes a second coupling means for coupling the device to a shower head. When it is desired to use this device to humidify the air in, for example, a house or apartment, the shower head is removed from the feed pipe and the device is coupled to the feed pipe in its place. The shower head is, in turn, coupled to the device. The water supply is then turned on and the valve means actuated to a position which diverts the flow of water from the shower head to the spray nozzle means. As the water flows through the spray nozzle means, it is atomized, thereby producing humidifying vapors.

Since the device of the present invention does not utilize a water reservoir, it does not require the use of a filter or chemicals to combat dangerous microorganisms or foul odors. Further, because the humidifying device is actuated by standard water line pressure and thus does not require electricity to operate, it poses no hazard of electrocution or danger of short circuiting. Due to the atomizing nozzle used in the present invention, and in particular, the strainer used in the nozzle, the dispersion of mineral dust is greatly reduced.

Due to its straightforward design, the present invention is inexpensive to manufacture. Further, due to its design, it is easy to install and greatly reduces the need for cleaning or maintenance. Since the present invention does not require electricity or any other external energy source to operate and can be easily coupled to an existing water supply, it is economical to operate. Because the device couples to a water supply, there is no need to continually fill it.

Due to its extremely small size and ease of installation, the humidifying device of the present invention can be portable and may be carried by travelers for use in hotel rooms or other temporary habitations. The present invention may be employed in applications currently impractical for any previously known type of humidifier, such as habitations without a source of electrical power and habitations continually in transit, such as mobile homes, trailers, and custom-coach buses.

DETAILED DESCRIPTION OF THE INVENTION

The preferred embodiment of the present invention shown in FIGS. 1–5 humidifies a space by utilizing the water supplied through the water feed pipe to produce an ultrafine mist that substantially evaporates and migrates through the space, thereby effectively raising the humidity level. The present invention takes advantage of a phenomenon which occurs when an individual takes a typical shower. If the shower is taken with the door of the bathroom closed, the bathroom fills with humidity produced by the shower. This is evidenced by the mirror condensing up with moisture. However, if the bathroom door is left open, the bathroom does not fill with humidity. Instead, the humidity migrates out of the bathroom to other parts of the home.

Figure 1:
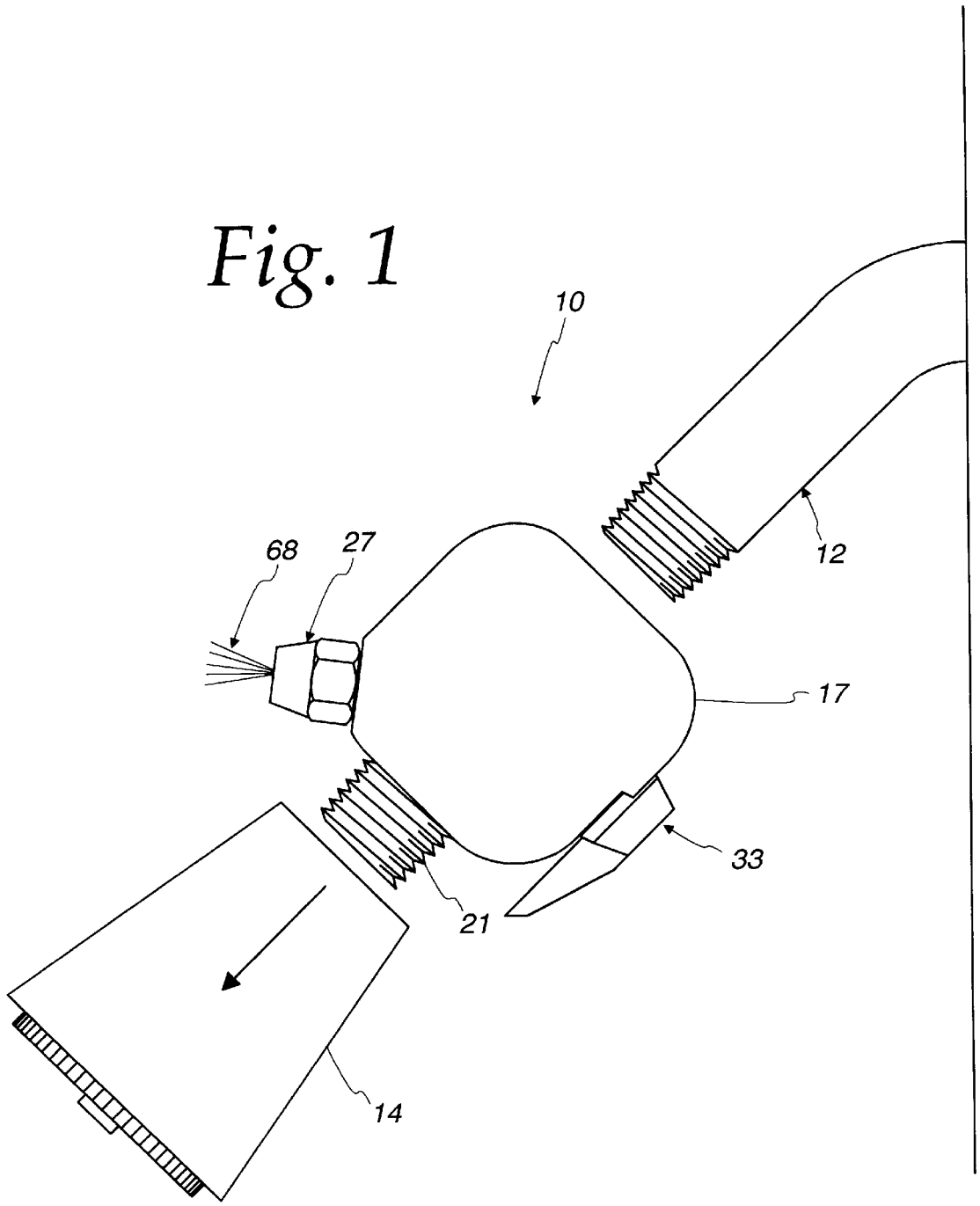
FIG. 1 is an exploded view of the humidifying device of the instant invention illustrated in its working environment.
Figure 2:
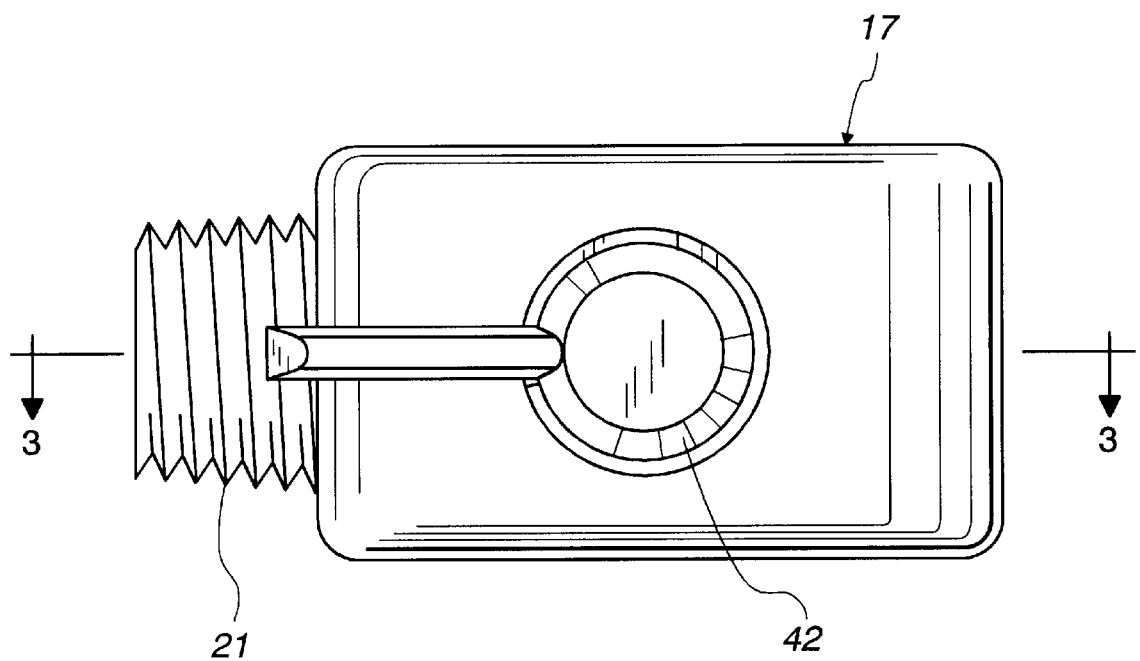
FIG. 2 is a side view of the humidifying device shown in FIG. 1.

As can be seen in FIG. 1, the humidifying device 10 of the instant invention is depicted in conjunction with a water feed pipe 12 and shower head 14. To couple the device 10 to the feed pipe 12 and head 14, the device is provided with a main body 17 having a first coupling means 19 for coupling the device to the feed pipe 12 and a second coupling means 21 for coupling the shower head 14 to the device 10. The device 10 is further provided with a third coupling means 24 for coupling a pressure atomizing spray nozzle means 27 to the device. The main body 17 also includes a central flow path 30 which enables fluid communication between the feed pipe 12 and either the shower head 14 or the nozzle means 27. Although the present invention is shown in use with a water feed pipe and shower head, it should be understood that it is not limited to such a use and can instead be adapted to be used with a water faucet, with a hose, or with some other type of water outlet.

Figure 3:
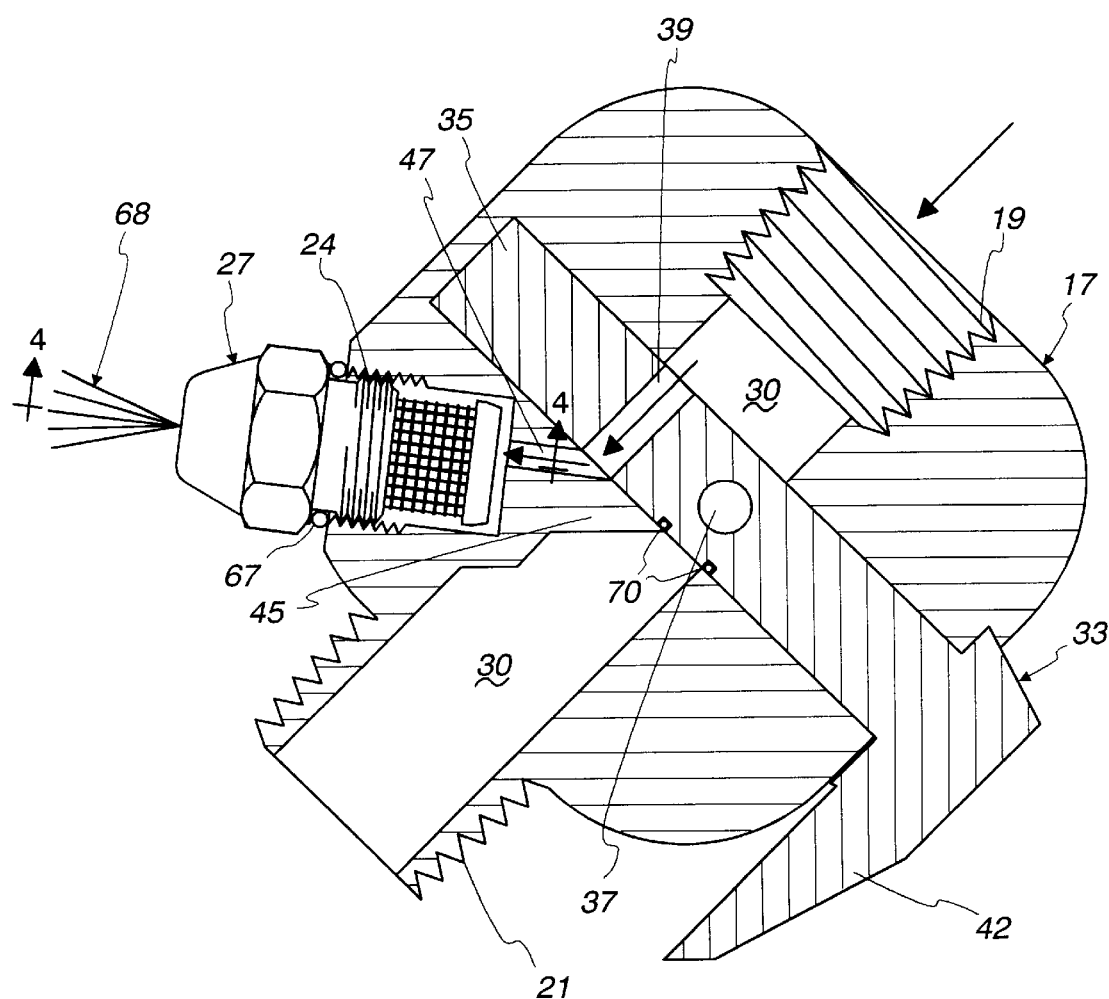
FIG. 3 is a cross-sectional view taken substantially on the plane of line 3—3 in FIG. 2 and showing in further detail the humidifying device of the instant invention.

As can be seen in FIG. 3, the first and third coupling means 19, 24 each comprise an internally threaded or female connection while the second coupling means 21 comprises an externally threaded or male connection. It should be understood that alternate equivalent coupling means can be used in place of the threaded means of the preferred embodiment.

To divert the flow of water which typically flows from the feed pipe 12 and through the shower head 14, the main body 17 of the humidifying device 10 is provided with a two-way diverter valve 33. As shown in FIG. 3, the diverter valve 33 includes a valve body 35 having a first passageway 37 and a second passageway 39. The two passageways are oriented 90° from each other. The valve body 35 traverses the central flow path 30 perpendicularly and can be placed in either a first position or a second position. In the first position, the first passageway 37 of the valve body 35 is aligned with the central flow path 30, thereby enabling flow from the feed pipe 12 to the shower head 14. In this first position, the second passageway 39 is not in fluid communication with the central flow path 30 and thus flow through the second passageway is prohibited. In the second position, which is shown in FIG. 3, the second passageway 39 is in alignment with the central flow path 30 while the first passageway 37 is not in fluid communication with the central flow path 30. Thus, the water flows through the feed pipe 12, through the second passageway 39 and through the spray nozzle means 27. To prevent water from escaping from the shower head while the valve is in the second position, the valve body 35 is provided with sealing means 70. The valve body 35 is further provided with a control knob 42 to move the valve body 35 between the first and second positions.

The main body 17 of the device 10 is provided with a portion 45 which extends partially into the central flow path 30. The portion 45 includes a third passageway 47 which provides fluid communication between the second passageway 39 of the valve body 35 and the spray nozzle means 27. When the valve body 35 is in the second position, the second passageway 39 is in fluid communication with the spray nozzle means 27 via the third passageway 47. When the valve body 35 is in the first position, the second passageway 39 is out of alignment with the third passageway 47 and thus flow through the spray nozzle means 27 is prohibited.

Figure 4:
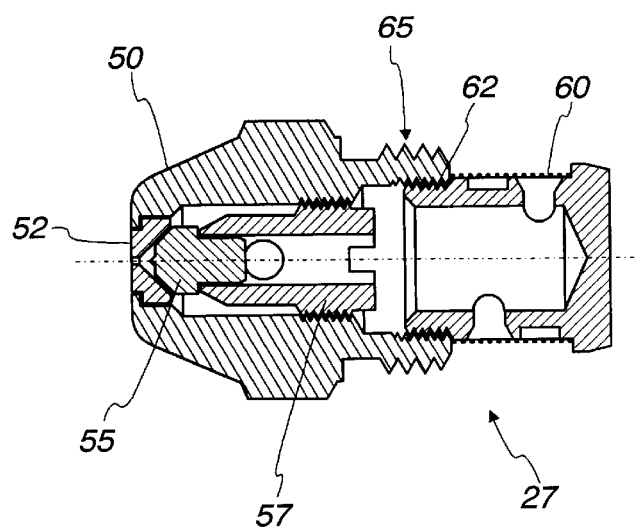
FIG. 4 is a cross-sectional view taken substantially on the plane of line 4—4 in FIG. 3 and showing in further detail the atomizing spray nozzle employed in the instant invention.

The spray nozzle means 27 which enables the atomization of the water consists of a pressure atomizing nozzle for central humidifying systems, commercially available from Delavan, Inc. of Bamberg, S.C. (Model #WDA, 0.65 gph) as well as from other vendors. As shown in FIG. 4, the nozzle consists of a threaded body 50 which houses an orifice disc 52, a distributor 55 and a retainer 57. The nozzle further is provided with a mesh strainer 60 which is coupled to one end of the nozzle body 50 via threads 62. The nozzle in turn is threaded into the third coupling means 24 via the threads 65 provided on nozzle body 50. As shown in FIG. 3, sealing means 67 may be provided about the spray nozzle means to form a seal with the main body of the device. The nozzle used in the preferred embodiment produces a finely atomized hollow cone spray pattern 68, as figuratively depicted in FIGS. 1 and 3.

In use, the main body 17 is coupled to the feed pipe 12 and the shower head 14 is in turn coupled to the main body 17 of the device 10. For conventional use of the shower head 14, the valve body 35 is placed in the first position, thereby enabling flow through the central flow path 30 and the first passageway 37. When it is desired to raise the humidity level of the surrounding atmosphere, the control knob 42 is rotated, placing the valve body 35 in the second position and thereby placing the central flow path 30 of the main body 17 in fluid communication with the spray nozzle means 27. The water supply to the feed pipe 12 is turned on and water flows through the first coupling means 19, the second passageway 39, the third passageway 47, into the strainer 60, through the retainer 57, past the distributor 55, and out the orifice 52. The water pressure forces the water to be atomized as it flows past the distributor 55 and out orifice 52 and becomes an ultrafine mist which is quickly dispersed and distributed throughout the atmosphere in the area to be humidified.

Figure 5:
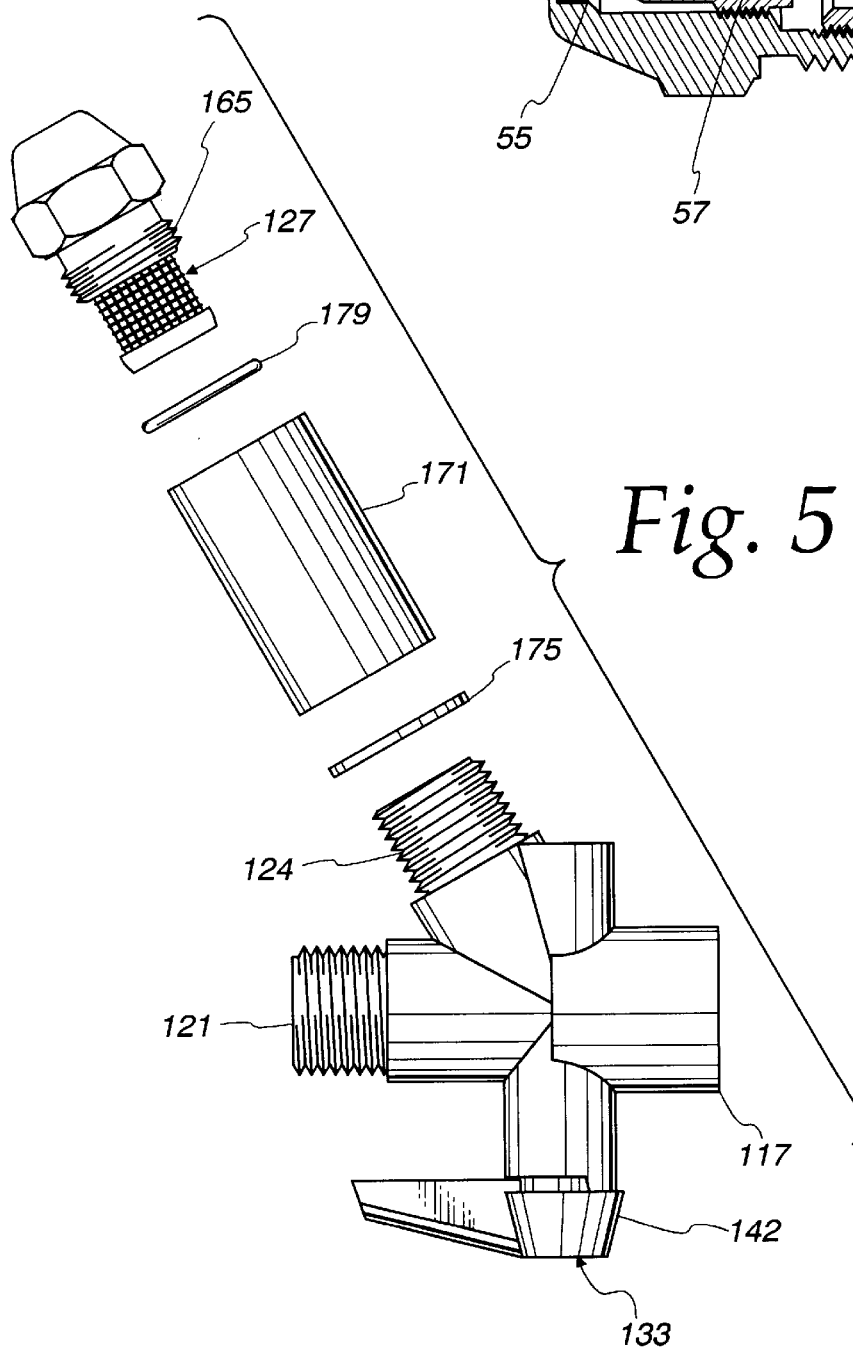
FIG. 5 is an exploded view of an alternate embodiment of the instant invention.

FIG. 5 depicts an alternate equivalent embodiment of the humidifying device of the present invention. The features which the alternate embodiment has in common with the embodiment of FIG. 1 are similarly numbered and will not be discussed again. The main difference between this alternate embodiment and the embodiment of FIG. 1 is the presence of a coupling member 171 which couples the spray nozzle means 127 to the main body 117. As seen in FIG. 5, the coupling member 171 is coupled to the main body 117 via a third coupling means 124. In this embodiment, the third coupling means 124 consists of an externally threaded or male connection. In turn, the spray nozzle means is then coupled to the member 171 via threads 165. It should be understood that the coupling member 171 is provided with two internal threaded connections (not shown) for coupling with the third coupling means 124 and with the threads 165 of the spray nozzle means 127. The coupling member 171 is further provided with first and second sealing means 175 and 179 at its inlet and outlet ends. In the preferred embodiment, the first sealing means comprises a washer and the second sealing means comprises an o-ring. Of course, alternate sealing means having suitable characteristics could be employed. The first sealing means 175 forms a pressure seal with the main body coupling while the second sealing means 179 forms a pressure seal with the spray nozzle means coupling.

In the embodiments depicted, the main body and the coupling member are injection molded of platable polyvinylchloride while the diverter valve and the control knob are press-molded of semi-hardened vinyl. However, the main body, coupling member, diverter valve, and control knob can be manufactured of any suitable plastic or metal.

It should be understood that the device of the present invention is not limited to the arrangements depicted. For example, the humidifying device could be incorporated directly into the shower head, instead of being a device attached to the feed pipe. Alternately, in shower heads which provide a choice of massaging spray patterns, the present invention could be one of the choices available. In such an embodiment, the two-way diverter valve can be replaced with a suitable flow diverter. It is also envisioned that a plurality of these humidifying devices could be provided in the ceiling of a shower, much like a sprinkler system.

It should be understood that various changes and modifications to the preferred embodiments described herein will be apparent to those skilled in the art. Such changes and modifications can be made without departing from the spirit and scope of the instant invention and without diminishing its attendant advantages. It is therefore intended that such changes and modifications be covered by the appended claims.

I claim:

1. A humidifying device for use in combination with a feed pipe and shower head comprising:

a main body having a first coupling means for coupling the device to a feed pipe and thus to a water supply, a second coupling means for coupling a shower head to the device, and a third coupling means for coupling an atomizing spray nozzle means to the device and for mounting the atomizing spray nozzle above the shower head and in a position to direct the atomizing spray in a substantially horizontal direction, the main body further having a central flow path to enable fluid communication between the water supply and the shower head or between the water supply and the atomizing spray nozzle means, a valve body positioned within the central flow path, the valve body having a first passageway and a second passageway therethrough; and the spray nozzle means capable of producing an ultrafine mist, the nozzle means being coupled to the valve body via the third coupling means.

2. The humidifying device of claim 1 wherein the valve body can be placed in a first position in which the first passageway is aligned with the central flow path, thereby allowing flow from the water supply to the shower head.

3. The humidifying device of claim 2 wherein the valve body can be placed in a second position in which the second passageway is aligned with the central flow path, thereby allowing flow from the water supply to the spray nozzle means and as a result producing an atomized mist of water to humidify the surrounding air.

* * * * *